United States Patent [19]  
Chablaix

[11] 4,367,241  
[45] Jan. 4, 1983

[54] DRY BAKED PRODUCT RICH IN PROTEINS AND A PROCESS FOR ITS PRODUCTION

[75] Inventor: René Chablaix, Lausanne, Switzerland

[73] Assignee: Societe d'Assistance Technique pour Produits Nestle S.A., Lausanne, Switzerland

[21] Appl. No.: 258,428

[22] Filed: Apr. 28, 1981

Related U.S. Application Data

[63] Continuation of Ser. No. 96,454, Nov. 21, 1979, abandoned.

[30] Foreign Application Priority Data

Dec. 1, 1978 [CH] Switzerland ............... 12291/78

[51] Int. Cl.³ .................... A21D 8/00; A23B 3/00
[52] U.S. Cl. ............................. 426/128; 426/242; 426/560; 426/410
[58] Field of Search ........ 426/560, 634, 656, 242–243, 426/234, 128, 410

[56] References Cited

U.S. PATENT DOCUMENTS 3,185,574  5/1965  Gabby et al. ............... 426/560
3,542,568  11/1970  Bouyer ....................... 426/234
3,556,817  1/1971  Jeppson ...................... 426/241
4,103,431  1/1978  Levinson .................... 426/234

Primary Examiner—Raymond N. Jones
Assistant Examiner—Elizabeth A. Hatcher
Attorney, Agent, or Firm—Vogt & O'Donnell

[57] ABSTRACT

The invention relates to a dry baked product, more particularly a biscuit, which is rich in proteins, of high nutritional value, large in dimensions and free from cracks, characterized in that it contains per 100 parts by weight:

from 5 to 20 parts of a protein of vegetable origin present in a particulate form equivalent to that of a semolina of which the grains pass through a 0.8 mm mesh U.S. sieve and are retained to a level of 98% by a 0.18 mm mesh U.S. sieve, from 1.5 to 6 parts of lactic protein, from 10 to 15 parts of fat, from 25 to 50 parts of cereal flour, the total protein content being from 10 to 20% by weight and at least 90% of the lysine being preserved, the balance being made up by water, sugar, salt, mineral salts, baking powder and flavorings, and to a process for producing this product.

11 Claims, No Drawings

DRY BAKED PRODUCT RICH IN PROTEINS AND A PROCESS FOR ITS PRODUCTION

This is a continuation, of application Ser. No. 96,454, filed Nov. 21, 1979, now abandoned.

This invention relates to the field of biscuits, more particularly dry biscuits.

The object of the present invention is to provide a dry baked product which is rich in proteins, of high nutritional value, large in dimensions and free from cracks.

Biscuits are food products which are very popular among children and adolescents in particular for their light and crispy texture, their pleasant taste and their golden appearance and for their ability to be readily consumed without preparation and to keep for long periods.

Their main disadvantage is that they represent a minimal contribution from the nutritional point of view because they consist essentially of carbohydrates. Apart from the fact that their protein content is low, the distribution of essential amino acids in this protein fraction is unbalanced because wheat is poor in lysine, this amino acid representing the limiting factor so far as the utilisation of these proteins by the human organism is concerned. In addition, during their baking, a considerable proportion of the lysine can be blocked by reaction with the reducing sugars present.

Attempts have been made to improve the nutritional value of traditional biscuits by replacing some of the wheat flour by proteins.

In one known process for the production of a baked product rich in proteins, the proteins are introduced by incorporating a combination of oil-bearing seeds in the flour and by adding gluten. However, this process is concerned with the production of bread where no problems of moulding arise.

In addition, it is known to produce soft-centre biscuits in which the central layer is formed by a spreading paste or cream rich in proteins which has been separately prepared and inserted between two layers of traditional baked biscuits.

However, when it is desired to incorporate the proteins in the paste of the biscuit and to bake the biscuit, specific problems arise. The oleaginous or lactic proteins fix a large quantity of water on account of their high moisture absorption capacity. The paste formed by the addition of water to a flour enriched with these proteins has a lumpy and rubbery consistency which gives rise to difficulties during moulding, baking and subsequent cooling. The consistency of the paste is unfavourable to moulding because it acquires a loose structure, fragmenting easily whilst, at the same time, being sticky, in addition to which its moisture content is very high. This additional water has to be evaporated which affects the economy of baking which has to last longer and, in some cases, baking does not even enable the required quantity of added water to be removed. This results in additional denaturing of the proteins and in increased blocking of the lysine. The phenomenon of checking of the biscuits also occurs. When the biscuits are cooled, cracks appear which are undoubtedly caused by the excessive internal stresses prevailing during baking and cooling.

It has been proposed to overcome the difficulties caused by the texture of the paste and to improve the economy of baking by premixing the proteins with fat and by adding the premix to the flour and the water so that the proteins are rendered completely or substantially inaccessible to water because they are protected by a coating of fat. This procedure is known as "creaming" of the proteins.

Although this method provides a partial solution to the above-mentioned problems, it does not take into account the phenomenon of cracking or the problem of preserving the nutritional value. This is because, to obtain minimum blocking of the lysine, it is necessary to produce a biscuit of large dimensions and, in particular sufficient thickness so that the surface of the crust is proportionally small because the non-enzymatic browning by Maillard's reaction between the lysine and the reducing sugars, by which baking is accompanied, takes place primarily at the level of the crust. However, the larger the dimensions of the biscuit, the greater the dangers of cracking.

It has now been found that it is possible to produce a biscuit rich in proteins of which the nutritional value is preserved to a large extent and which is therefore of large dimensions whilst, at the same time avoiding production difficulties during moulding, baking and cooling.

Accordingly, the present invention relates to a dry baked product which is rich in proteins, of high nutritional value, large in dimensions and free from cracks, characterised in that it contains per 100 parts by weight:

from 5 to 20 parts of proteins of vegetable origin present in the form of semolina of which the grains pass through a 0.8 mm mesh U.S. sieve and are retained to a level of 98% by a 0.18 mm mesh U.S. sieve, from 1.5 to 6 parts of lactic protein, from 10 to 15 parts of fat, from 25 to 50 parts of cereal flour, the total protein content being from 10 to 20% and at least 90% of the lysine being preserved.

the balance being formed by water, sugar, salt, mineral salts, baking powder and flavourings.

In the context of the invention, 90% preservation of the lysine is understood to mean that at most 10% of the lysine present in the protein fraction has reacted with the reducing sugars by Maillard's reaction during baking.

To obtain this result, the biscuit must have relatively large dimensions, i.e. a thickness of at least 8 mm for a volume of from 20 to 60 cc.

The proteins of vegetable origin are selected from protein extracted from oleaginuous substances, such as for example peas, lentils, haricot beans, soya beans, peanuts, hazel nuts, almonds etc. It is essential for the proteins to be present in a particulate form equivalent to that of semolina of which the grain size is well defined, as indicated above. This is because it has been found that the grain size has a decisive bearing on the possibility of a high protein content, on the preservation of the nutritional value and on the absence of cracking during cooling. The selected grain size enables less fat to be used during creaming of the proteins. In addition, the protein is better protected and, hence, the lysine better preserved than in the case of a finer powder. By virtue of the uniformity of the grain size, the texture is regular and the dangers of checking are reduced.

It is preferred to use a concentrate of soya proteins having a high protein content of the order of 70%, based on dry matter.

The lactic protein used is essentially casein which has a high nutritional value. The casein is preferably used in the form of caseinate prepared from rennet or acid casein.

The fat may be of animal origin or, preferably vegetable origin. It may be present in the form of an oil or a fat which is solid at ambient temperature or even in the form of an emulsion with water. Thus, it is possible to use an edible oil, for example peanut oil, rape seed oil, cottonseed oil, or an edible fat, such as copra fat, coconut butter, a hydrogenated peanut fat or even an emulsion of the margarine type. The fats used must be sufficiently plastic and preferably have a melting range of from 20° to 37° C.

The cereal flour is in general a wheat flour which gives a paste whose elasticity is adapted to the forming technique used. Cornstarch or potato starch may be added to the flour in a quantity of approximately 5 to 10%, based on the weight of the flour, in order to reduce its strength.

The biscuit also contains the usual ingredients, such as sugar, salt, mineral salts, vitamins, flavourings and baking powder.

The baking powder may be a traditional commercial baking powder or, preferably, ammonium carbonate or ammonium bicarbonate.

It is preferable to add flavourings which are compatible with the particular flavour of the soya, giving a praline, caramel, vanilla, nutty or fruity, lemon, orange or similar note.

The present invention also relates to a process for the production of the dry baked product rich in proteins which is characterised in that the vegatable proteins, the lactic proteins and the fat are mixed, the cereal flour, the sugar, the water, the salt, the mineral salts, the baking powder and the flavourings are separately mixed, the two premixes are mixed in a kneader, the paste obtained is left standing, moulded and baked, the products issuing from the oven are either arranged in several layers in boxes and are left to cool progressively to ambient temperature or treated in a high frequency oven.

The proteins and the fat are preferably premixed for 8 to 15 minutes in a low-speed kneader.

The other ingredients are mixed in a second kneader first for 2 to 4 minutes at low speed and then for 2 to 4 minutes at high speed.

The premix of the proteins and the fat is then introduced into this second kneader in which it is kneaded with the other premix preferably for 1 to 2 minutes at low speed and then for 2 to 3 minutes at high speed.

The paste is then left standing for 30 to 50 minutes to stabilise.

The biscuits are then formed either in a cutting machine or on forming cylinders.

After forming, the biscuits are baked for 15 to 25 minutes in an oven comprising several temperature zones with temperatures in the different zones decreasing from 190° C. to 145° C. The biscuits issuing from the oven have a temperature of approximately 90° C. and cool. When their temperature is between 80° C. and 60° C., they are placed in several layers in covered boxes which are then stored in a room with an ambient temperature of from 20° to 30° and a relative humidity of from 65 to 75%.

By virtue of the fact that the biscuits are arranged in several layers in covered boxes, the heat is slowly dissipated into the ambient atmosphere and the biscuits gradually cool over a period of from 6 to 24 hours to a temperature close to that of the room. This process is essential in that it enables the appearance of cracks to be avoided by eliminating any thermal shocks and by allowing progressive reduction of the moisture gradient between the centre and the surface of the biscuits.

As an alternative, which is preferred since it allows a continuous production, the biscuits issuing from the baking oven may be post-dried by treating them in a high frequency oven at frequencies in the range of 1 to 100 MHz, i.e. at 27.125 MHz or 40.665 MHz (frequencies presently reserved for scientific and industrial applications).

The duration of the treatment and the power applied are adapted to the size of the production line. Satisfactory results may be obtained i.e. at a power of 40 to 100 Kw during 30 seconds to 1 minute.

This treatment, favouring the removal of residual moisture at the center, allows stress releasing and reducing of checking.

After cooling, the biscuits are packed for example in packets in a wrapping which is impermeable to air and moisture.

The following Example given by way of illustration shows how the invention may be carried out in practice. In this Example, the parts and percentages quoted are by weight unless otherwise indicated.

EXAMPLE

Preparation of the paste

The following ingredients are introduced in into a TWIN kneader:
51 kg of soya concentrate (*)
13.5 kg of sodium caseinate and
51 kg of hydrogenated peanut fat
and mixed at low speed for 10 minutes.
*Composition

| | |
|---|---|
| Moisture | 8.0% |
| Protein (N × 6.25), based on dry matter | 71.0% |
| Fat | 1.5% |
| Ash | 4.5% |
| Raw fibre | 3.7% |
| Carbohydrates | 17.0% |

The following ingredients are introduced into a BAKERS-PERKINS "high-speed" kneader:
160 kg of wheat flour which, if desired, may be replaced by a mixture of 150 kg of wheat flour and 6 kg of cornstarch,
87 kg of sugar and then
37 kg of water,
2.4 kg of salt (sodium chloride),
4 kg of mineral salts (oligo elements) and vitamins,
1.4 kg of baking powder,
350 ml of flavourings,
and mixed for 2 to 4 minutes at low speed and then for 2 to 4 minutes at high speed.

The premix of proteins and fat is introduced into this second kneader and the whole is kneaded for 1 to 2 minutes at low speed and then for 2 to 3 minutes at high speed.

The paste is then left standing for 30 to 50 minutes.

Grain size

All the material passes through a 0.8 mm or 20 U.S. mesh sieve; 98% of the material is retained by a 0.18 mm or 80 U.S. mesh sieve.

Moulding

Moulding is carried out in the usual way in a BAKER-PERKINS moulding machine comprising contra-rotating cylinders (one—the feeder—with groovers and the other with cavities), the paste being forced into the cavities under a pressure of from 20 to 35 atmospheres.

Baking

The formed biscuits are then introduced into a BAKER-PERKINS turboradiant oven. Baking lasts 17 minutes, the biscuits travelling from one end of the furnace to the other through zones decreasing in temperature from 190° C. to 145° C. The biscuit obtained weighs between 13 and 15 g for a thickness of from 10 to 12 mm and leaves the oven with a temperature of approximately 90° C.

Cooling and packing

On reaching a temperature of 80° C., the biscuits removed from the oven are placed in several layers in boxes which are covered and stored in a room having an ambient temperature of from 20° to 30° C. and a relative humidity of from 65% to 75%.

The temperature of the biscuits decreases progressively over a period of 24 hours to the temperature of the room, after which the biscuits are packed in portions of three in a wrapping material impermeable to air and moisture.

I claim:

1. A process for producing a dry baked product which is rich in proteins, high in nutritional value, has a thickness of at least 8 mm for a volume of from 20 to 60 cc, is free from cracks, and made from, per 100 parts by weight,
    5 to 20 parts of a protein of vegetable origin present in a particulate form of such a size so as to pass through a 0.8 mm mesh U.S. sieve and are retained to a level of 98% by a 0.18 mm mesh U.S. sieve;
    1.5 to 6 parts lactic protein;
    10 to 15 parts of fat;
    25 to 50 parts of cereal flour;
    the balance being formed by water, sugar, mineral salts, baking powder and flavorings;
    the total protein content being from 10 to 20% by weight;
comprising:
    (a) mixing the vegetable proteins, the lactic proteins and the fat to form a first premix;
    (b) separately mixing in a kneader the cereal flour, the sugar, the water, the salt, the mineral salts, the baking powder and the flavorings to form a second premix;
    (c) adding the first premix of proteins and fat to the second premix;
    (d) kneading the resulting mixture to obtain a paste which is left standing for a period of time sufficient to stabilize the mixture, molding into the desired shape and baking over a period of from 15 to 25 minutes in an oven comprising several temperature zones with temperatures in the zones decreasing from 190° C. to 145° C., thereafter placing the baked product in several layers in boxes and leaving to cool progressively to ambient temperature or post-drying in a high frequency oven;
    wherein at least 90% of the lysine contained in the proteins is preserved.

2. The process of claim 13, where, on leaving the oven, the products are progressively cooled from a temperature of from 80° to 60° C. to ambient temperature over a period of from 6 to 24 hours after having been placed in several layers in covered boxes which enables checking to be avoided, and are then packed in water-tight and air-tight packs.

3. The process of claim 1, where, on leaving the baking oven, the products are treated in a high frequency oven for 30 to 60 seconds which enables checking to be avoided, and are then packed in water-tight and air-tight packs.

4. The process of claim 1, wherein the protein of vegetable origin is in the form of a concentrated protein extracted from oleaginous substances.

5. The process of claim 4, wherein the protein of vegetable origin is a concentrate of soya protein.

6. The process of claim 1, wherein the lactic protein is casein in the form of caseinate.

7. The process of claim 1, wherein vitamins are also included.

8. The process of claim 1, wherein the cereal flour is wheat flour containing up to 10% by weight, based on the flour, of corn starch.

9. The process of claim 1, wherein the fat is a vegetable oil or a plastic vegetable fat having a melting range of from 20° to 37° C.

10. The process of claim 1, wherein the baking powder is ammonium carbonate or ammonium bicarbonate.

11. The dry baking product produced by the process of claim 1.

* * * * *

UNITED STATES PATENT AND TRADEMARK OFFICE
CERTIFICATE OF CORRECTION

PATENT NO. : 4,367,241
DATED : January 4, 1983
INVENTOR(S) : Rene Chablaix

It is certified that error appears in the above—identified patent and that said Letters Patent is hereby corrected as shown below:

Column 3, line 31, "vegatable" should read --vegetable--.

Column 6, line 19, "claim 13" should read --claim 1--.

Signed and Sealed this

Fifteenth Day of March 1983

[SEAL]

Attest:

GERALD J. MOSSINGHOFF

Attesting Officer     Commissioner of Patents and Trademarks